United States Patent [19]
Picht et al.

[11] Patent Number: 6,010,779
[45] Date of Patent: Jan. 4, 2000

[54] PHOSPHOR COMPOSITION COMPRISING FINE-GRAIN AND COARSE-GRAIN $SiO_2$ PARTICLES

[75] Inventors: Friederike Picht, Düren; Jacqueline Merikhi, Aachen; Joachim Opitz, Aachen; Hans-Otto Jungk, Aachen, all of Germany; Jan W. G. de Bakker, Geldrop, Netherlands; Miguel Boutelje; Arlis G. Van Braam, both of Eindhoven, Netherlands; Frans H. A. Vollebregt, Waalre, Netherlands

[73] Assignee: U.S. Philips Corporation, New York, N.Y.

[21] Appl. No.: 08/957,990

[22] Filed: Oct. 5, 1997

[30] Foreign Application Priority Data

Nov. 12, 1996 [DE] Germany .......................... 196 46 521

[51] Int. Cl.$^7$ ...................................................... B32B 5/16
[52] U.S. Cl. .......................... 428/329; 427/219; 428/330; 428/331; 428/404

[58] Field of Search ..................................... 428/403, 404, 428/331, 329, 330; 427/212, 215, 219

[56] References Cited

U.S. PATENT DOCUMENTS

| | | | |
|---|---|---|---|
| 4,473,634 | 9/1984 | Dodds et al. ............................ | 430/272 |
| 4,544,605 | 10/1985 | Miyazaki et al. ....................... | 428/404 |
| 5,593,782 | 1/1997 | Budd ....................................... | 428/403 |

*Primary Examiner*—Hoa T. Le
*Attorney, Agent, or Firm*—Norman N. Spain

[57] ABSTRACT

A display screen having a phosphor coating comprising a phosphor composition of a phosphor provided with a coating which comprises one or more oxgyen compounds of the elements zinc, aluminium, magnesium, calcium and barium as well as colloidal SiOparticles, said colloidal $SiO_2$ particles being composed of $SiO_2$ particles having an average size of 4 nm$\leq$d$\leq$30 nm, corresponding to a specific surface of 100 m$^2$/g$\leq$A$_s$$\leq$550 nm m$^2$/g, and $SiO_2$ particles having an average size of 50 nm$\leq$d$\leq$150 nm, corresponding to a specific surface of 25 m$^2$/g$\leq$A$_s$$\leq$70 m$^2$/g.

8 Claims, No Drawings

PHOSPHOR COMPOSITION COMPRISING FINE-GRAIN AND COARSE-GRAIN SIO$_2$ PARTICLES

BACKGROUND OF THE INVENTION

The invention relates to a display screen, in particular a color display screen for a cathode ray tube, having a phosphor coating comprising a phosphor composition of a phosphor provided with a coating which comprises one or more oxygen compounds of the elements zinc, aluminium, magnesium, calcium and barium as well as colloidal SiO$_2$ particles.

The invention also relates to a phosphor composition of a phosphor provided with a coating comprising one or more oxygen compounds of the elements zinc, aluminum, magnesium, calcium and barium as well as colloidal SiO$_2$ particles.

The invention further relates to a method of manufacturing a phosphor composition from a phosphor provided with a coating comprising one or more oxygen compounds of the elements zinc, aluminum, magnesium, calcium and barium as well as colloidal SiO$_2$ particles.

Display screens of cathode ray tubes are provided on the inner surface with structured phosphor layers which exhibit a dot pattern or a stripe pattern. In the case of color display tubes, each phosphor element of the phosphor layer is composed of a triplet of phosphor elements which each emit one of the three primary colors red, blue and green. This structured phosphor layer is customarily provided on the screen glass by means of a photochemical process, in which phosphor suspensions are used in the wet-chemical variant, and phosphor lacquers are used in the dry variant. In the wet-chemical process for coating screen glass with phosphors, aqueous phosphor suspensions are used which comprise, for example, polyvinyl alcohol (PVA) as the binder and ammonium dichromate (ADC) as the light-sensitive component.

Phosphor coatings which are applied to display screens by means of the "flow coat" process must meet the following requirements: a high packing density of the phosphor material in the phosphor coating in order to obtain an optimum screen brightness, a good homogeneity of the phosphor coating, i.e. preventing structures by means of the flow behavior of the suspension, or preventing "pin holes", a good homogeneity of the thickness of the phosphor coating, a high precision of the projection of the shadow mask structure on the structured phosphor coating, a high definition of the individual phosphor element, a good adhesion of the phosphor elements on the screen glass, a low degree of color impurity of the phosphor coating of an emission color as well as a low degree of haziness on unexposed screen glass.

Examples of criteria for a good stability and processability of phosphor suspensions in the display-screen process are a good stability of the particle-size distribution when an electrolyte solution is added and an ultrasonic treatment is carried out, a high filterability over a prolonged period of time when the pH-values are critical, and a medium-compact to compact phosphor sediment after sedimentation for 24 hours.

When the phosphor particles are processed in a suspension and when the phosphor coating is formed on the display-screen glass, in the wet-chemical display-screen process, numerous properties of said phosphor particles are influenced substantially by the surface properties of the phosphor powders from which the phosphor suspensions are prepared. To control the surface properties of the phosphor powders in view of the display-screen process, it proved to be advantageous to provide the inorganic phosphor powders, after their preparation, with chemically deviant coatings.

In U.S. Pat. No. 5,366,834, a method of manufacturing a display screen for an X-ray tube is disclosed, in which the inner surface of a glass face plate is coated with a phosphor suspension, said phosphor comprising a) phosphor particles, b) a first layer which is formed on the phosphor particles in a quantity of 0.1 to 5 wt. %, calculated with respect to the weight of the phosphor particles, said layer being composed of an essentially uniform silicon-dioxide film, and c) a second layer in a quantity of 0.008 to 1.5 wt. %, calculated with respect to the weight of the phosphor particles, said layer being formed on the first layer and being composed, at least, of a metal selected from the group formed by zinc and aluminium, and an alkaline earth metal and, at least, an element selected from the group formed by colloidal silicon oxide, aluminum-oxide sol and titanium-oxide-sol, each having a particle size of 50 nanometers or less.

Nowadays, the quality of display screens is to meet ever higher requirements in terms of brightness, color purity, absence of haziness and definition of the structured phosphor coating.

SUMMARY OF THE INVENTION

Therefore, it is an object of the invention to provide a display screen with a phosphor coating in such a manner that an optimal brightness, color purity, absence of haziness, definition and adhesion of the phosphor material to the display-screen glass is achieved. To attain a high packing density of the phosphor in the phosphor coating, a good adhesion of the phosphor material to the display-screen glass and hence a high display-screen brightness, very stable phosphor suspensions are required.

In accordance with the invention, this object is achieved by a display screen having a phosphor coating which comprises a phosphor composition of a phosphor provided with a coating comprising one or more oxygen compounds of the elements zinc, aluminum, magnesium, calcium and barium as well as colloidal SiO$_2$ particles, said colloidal SiO$_2$ particles being composed of SiO$_2$ particles having an average particle size of 4 nm$\leq$d$\leq$30 nm, corresponding to a specific surface of 100 m$^2$/g$\leq$A$_s$$\leq$550 m$^2$/g, and SiO$_2$ particles having an average particle size of 50 nm$\leq$d$\leq$150 nm, corresponding to a specific surface of 25 m$^2$/g$\leq$A$_s$$\leq$70 m$^2$/g.

A display screen coated in accordance with the invention is characterized by a surprisingly improved color purity, display-screen brightness and adhesion of the phosphor to the display-screen glass as well as by the absence of haziness. The structured phosphor coating further exhibits a high packing density of the phosphor material. In addition, the phosphor elements are sharply defined. The phosphor coating is very homogeneous and free of "pin holes".

Within the scope of the invention it is preferred that the coating comprises 0.01 wt. % to 0.07 wt. %, calculated with respect to the phosphor, of colloidal SiO$_2$ particles having an average particle size of 4 nm$\leq$d$\leq$30 nm, and 0.10 wt. % to 1.5 wt. %, calculated with respect to the phosphor, of colloidal SiO$_2$ particles having an average particle size of 50 nm$\leq$d$\leq$150 nm.

It is further preferred that the molar ratio of the overall quantity of colloidal SiO$_2$ particles to the overall quantity of the oxygen compounds of the elements Zn, Al, Mg, Ca and Ba ranges from 5:1 to 30:1 in the coating."

Within the scope of the invention, it is particularly preferred that the oxygen compound is a zinc-oxygen compound.

It is preferred that the colloidal $SiO_2$ particles having an average particle size of 50 nm$\leq$d$\leq$150 nm, corresponding to a specific surface of 25 m$^2$/g$\leq$A$_s$$\leq$70 m$^2$/g, have a polydisperse particle-size distribution.

According to a preferred further embodiment the coating contains a color-filter pigment.

According to a still further preferred embodiment the phosphor preparation contains a color-filter pigment in a separate coating.

The invention also relates to a phosphor composition of a phosphor provided with a coating comprising one or more oxygen compounds of the elements zinc, aluminum, magnesium, calcium and barium as well as colloidal $SiO_2$ particles, which colloidal $SiO_2$ particles are composed of particles having an average particle size of 4 nm$\leq$d$\leq$30 nm, corresponding to a specific surface of 100 m$^2$/g$\leq$A$_s$$\leq$550 m$^2$/g, and particles having an average size of 50 nm$\leq$d$\leq$150 nm, corresponding to a specific surface of 25 m$^2$/g$\leq$A$_s$$\leq$70 m$^2$/g.

Such a phosphor composition can be processed very readily because it exhibits a very high filterability, over a prolonged period of time and at lower pH-values. The exceptionally good dimensional stability of the suspension of phosphors coated in accordance with the invention is demonstrated by the good stability of the particle-size distribution when an electrolyte solution is added and an ultrasonic treatment is carried out. After 24 hours, a semicompact to compact sediment is obtained. Further advantages are the very low degree of haziness, the improved adhesion of the phosphor to the display-screen glass as well as the high density and good homogeneity of the resultant phosphor coatings.

The invention further relates to a method of manufacturing a phosphor composition from a phosphor provided with a coating comprising one or more oxygen compounds of the elements zinc, aluminum, magnesium, calcium and barium as well as colloidal $SiO_2$ particles, with diluted ammonia being added to a phosphor suspension to obtain a pH-value $\geq$9.2, and said suspension being ground with colloidal $SiO_2$ particles having a size of 4 nm$\leq$d$\leq$30 nm, a colloidal solution of colloidal $SiO_2$ particles having an average size of 50 nm$\leq$d$\leq$150 nm, an aqueous ammonium-salt solution, an aqueous solution of a water-soluble salt of one of the elements of the group formed by zinc, aluminum, magnesium, calcium and barium being successively added to the phosphor suspension, and, subsequently, the pH-value of the phosphor suspension being reduced to a value of pH$\leq$7 by means of the diluted acid, and, next, the pH-value of the phosphor suspension being increased to pH$\geq$8.

This coating process enables phosphor powders to be tenaciously coated with fine-grain and coarse-grain colloidal $SiO_2$ and with the hydroxides or oxides of the, elements Zn, Al, Mg, Ca and Ba.

These and other aspects of the invention will be apparent from and elucidated with reference to the embodiments described hereinafter.

DETAILED DESCRIPTION OF THE INVENTION

For the starting material of the phosphor composition in accordance with the invention, use can be made of all customary phosphors, for example, blue ZnS:Ag,Al, blue ZnS:Ag,Cl, green ZnS:Cu,Au,Al, green ZnS:Cu,Al or red $Y_2O_2S$:Eu.

It may alternatively be preferred that the starting material is an already pigmented phosphor which is coated with color-filter pigments, for example, ZnS:Ag,Al pigmented with $CoAl_2O_4$ or $Y_2O_2S$:Eu pigmented with $Fe_2O_3$, to improve the image contrast.

The phosphor can be coated, in one coating process, with the color pigment and the coating constituents in accordance with the invention, i.e. the fine-grain and coarse-grain colloidal $SiO_2$ and one or more oxygen compounds of the elements Zn, Al, Mg, Ca and Ba, or the color pigment can be provided, in a separate coating process, onto the phosphor particles and form a separate coating.

The phosphor coating comprises one or more oxygen compounds of the elements zinc, aluminum, magnesium, calcium and barium. Within the scope of the invention, "oxygen compound" is to be understood to mean the hydroxides and oxides of these elements.

The phosphor coating further comprises two different types of colloidal $SiO_2$, namely, first, fine-grain $SiO_2$ having a particle size of 4 nm$\leq$d$\leq$30 nm, corresponding to a specific surface of 100 m$^2$/g$\leq$A$_s$$\leq$550 m$^2$/g, and, second, coarse-grain $SiO_2$ having an average particle size of 50 nm$\leq$d$\leq$150 nm, corresponding to a specific surface of 25 m$^2$/g $\leq$A$_s$$\leq$70 m$^2$/g.

Examples of fine-grain $SiO_2$ colloids having a particle size of 4 nm$\leq$d$\leq$30 nm, corresponding to a specific surface of 100 m$^2$/g$\leq$A$_s$$\leq$550 m$^2$/g, are: NYACOL 215® (Akzo Nobel): A$_s$=545 m$^2$/g, LUDOX FM® (DuPont de Nemours): A$_s$=450 m$^2$/g, LUDOX SM® (DuPont de Nemours): A$_s$=345 m$^2$/g, LUDOX AS® (DuPont de Nemours): A$_s$=135 m$^2$/g, BINDZIL® 50/130 (Akzo Nobel): A$_s$=130 m$^2$/g, LEVASIL® 100 (Bayer): A$_s$=100 m$^2$/g.

Examples of coarse-grain $SiO_2$ colloids having an average particle size of 50 nm$\leq$d$\leq$150 nm, corresponding to a specific surface of 25 m$^2$/g$\leq$A$_s$$\leq$70 m$^2$/g, are: NYACOL® 9950 (Akzo Nobel): A$_s$=27 m$^2$/g, LEVASIL® VPAC4056 (Bayer): A$_s$=50 m$^2$/g, SYTON®W (DuPont de Nemours): A$_s$=70 m$^2$/g, MONOSPHER® 100 (E. Merck), MONOSPHER® 150 (E. Merck). A coarse-grain, polydisperse $SiO_2$ colloid is preferred. However, it is alternatively possible to use a coarse-grain, monodisperse $SiO_2$ colloid.

The molar ratio of the overall quantity of fine-grain and coarse-grain $SiO_2$ colloid to the overall quantity of the oxygen compounds of the elements Zn, Al, Mg, Ca and Ba may be varied in a range from 5:1 to 30:1 in the phosphor coating.

The weight ratio of the coating to the phosphor may range from 0.10 wt. % to 2.0 wt. % in the phosphor composition.

To manufacture the phosphor composition in accordance with the invention, in succession, the following process steps are carried out:

a) First, the pH-value of the phosphor suspension is adjusted to a value of at least 9.2 by means of diluted ammonia. In the subsequent wet-chemical grinding process, the raw phosphor is properly dispersed by means of a fine-grain $SiO_2$ colloid having a particle size of 4 nm$\leq$d$\leq$30 nm, corresponding to a specific surface of 100 m$^2$/g$\leq$A$_s$$\leq$550 m$^2$/g. The quantity of this fine-grain $SiO_2$ colloid (calculated as $SiO_2$) customarily ranges from 0.010 wt. % to 0.070 wt. %, calculated with respect to the raw phosphor.

b) The solution of a coarse-grain $SiO_2$ colloid having an average particle size of 50 nm$\leq$d$\leq$150 nm, corresponding to a specific surface of 25 m$^2$/g$\leq$A$_s$$\leq$70 m$^2$/g, is added to this phosphor suspension. The quantity of this coarse-grain $SiO_2$ colloid (calculated as $SiO_2$) customarily ranges from 0.10 wt. % to 1.5 wt. %, calculated with respect to the raw phosphor.

c) Optionally, one or more aqueous ammonium-salt solutions, preferably ammonium-acetate solution or ammonium-nitrate solution, ammonium-sulphate solution or ammonium-hydrogen-sulphate solution, is or are added to the phosphor suspension. The molar ratio of the overall quantity of the ammonium salts to the overall quantity of the oxygen compounds of the elements Zn, Al, Mg, Ca and Ba customarily ranges from 1:10 to 10:1.

d) One or more aqueous salt solutions of the elements zinc, aluminium, magnesium, calcium and barium, the acetate salts and sulphate salts being preferred, is or are added to the phosphor suspension. The molar ratio of the overall quantity of fine-grain and coarse-grain colloidal $SiO_2$ to the overall quantity of the oxygen compounds of the elements Zn, Al, Mg, Ca or Ba customarily ranges from 1:5 to 1:30.

e) If the pH-value of the phosphor suspension is above 7, then this value is reduced to at least pH=7 by means of diluted acid, for example, $CH_3COOH$, $H_2SO_4$, $HNO_3$ or HCl.

f) An ammoniac solution, diluted potassium hydroxide solution or sodium hydroxide solution are added to the phosphor suspension, while stirring for some time, to increase the pH-value to pH$\geq$8.

g) If the destabilization of the product suspension of the coated phosphor is insufficient, the phosphor suspension is destabilized completely by adding one or more aqueous ammonium-salt solutions, preferably ammonium-acetate solution or ammonium-nitrate solution, ammonium-sulphate solution or ammonium-hydrogen-sulphate solution, the pH-value of the phosphor suspension being maintained at a constant value of pH$\geq$8 by adding an ammonia solution. The suspension of the coated phosphor is again stirred for some time.

h) The phosphor thus coated is allowed to sediment. It is decanted and, if desired, washed and filtered off.

i) The phosphor composition is dried in air for several hours at 140° C.

The adjustment of the pH-value to $\geq$9.2 by means of ammonia prior to the addition of the fine-grain $SiO_2$ colloid as the dispersing agent in process step a) is important to obtain a proper filterability of the phosphor suspension when it is wet-sieved through a fine sieve after the wet-chemical grinding process. If this condition is not met, a substantially reduced filterability of the stabilized phosphor suspension results after the dispersion process.

If necessary, the wet-chemical pigmentation of the phosphor can be carried out, for example, as a precipitation reaction or a colloid-chemical reaction, between process step a) and process step b). After the pigmentation process, the phosphor suspension is washed and the pH-value set at 7.0$\leq$pH$\leq$9.0, whereafter the suspension is subjected to further processing in process step b). If necessary, for example if the pigment compound is formed from a precipitated pre-product or to provide the pigment particles with a special morphology or to improve the adhesion of the pigment to the phosphor, a calcining process at an elevated temperature is carried out after the drying step i).

Using the phosphor composition in accordance with the invention, the display screen can be manufactured, for example in accordance with the "flow coating" method, in the following manner. The coated phosphor powder of an emission color is dispersed in a binder solution on the basis of, for example, polyvinyl alcohol (PVA), which solution is photoactivated by means of, for example, ammonium dichromate (ADC). Depending on the phosphor used and the processing conditions of the suspension in the display-screen process, the individual components of the phosphor suspension, i.e. phosphor powder, water, binder, dispersing agent, stabilizer and light-sensitive components are mixed in a specific order and concentration in accordance with a defined recipe. The suspension of the phosphor composition is provided on the inner surface of the prepared glass plate of the display screen rotating in the "flow coat" apparatus. The rotation of the display screen causes the phosphor suspension to be uniformly distributed on the display screen. Any excess suspension is centrifuged-off. The moist phosphor coating formed is dried. The inner surface of the glass plate of the display screen is provided with a shadow mask which is situated at some distance from the phosphor coating. The phosphor coating is irradiated through this shadow mask by ultraviolet light, thereby causing the irradiated regions of the phosphor coating to cure. The phosphor coating is developed by means of warm water, i.e. the parts of the phosphor coating which have not been cured are removed. The structured phosphor coating is dried.

These process steps are successively carried out for all three phosphor types in the emission colors green, blue and red. Subsequently, the display screen is subjected to a burn-out process at approximately 440° C. in order to remove any organic binder still present in the phosphor coating.

EXAMPLE 1

A quantity of 1 kg of green-luminescent ZnS:Cu,Au,Al-phosphor powder is washed and sieved, whereafter it is decanted. Its pH-value is adjusted to 9.3 by means of diluted ammonia. A quantity of 13 g of a 3.0 wt. % $SiO_2$-containing LUDOX® AS-solution (DuPont de Nemours) is added as the dispersing agent. This phosphor suspension is subjected to a wet-grinding process for 2 hours. After the removal of the grinding bodies, and after diluting to a suspension volume of 3.0 l water and wet-sieving of the suspension through a fine sieve, the stabilized phosphor suspension is obtained.

A quantity of 170 g of a 3.0 wt. % $SiO_2$-containing NYACOL® 9950-solution (Akzo Nobel) are added to the properly dispersed suspension of the ZnS:Cu,Au,Al-phosphor having a pH-value of 8.0. In addition, a quantity of 9.0 ml of a 2 molar ammonium-acetate solution is added to the phosphor suspension, thereby reducing the pH-value value to 7.1. Subsequently, 18 g of a $Zn(CH_3COO)_2$-solution containing 8.0 wt. % ZnO are added. As a result, the pH-value decreases to pH=6.0. By adding 1 molar $CH_3COOH$-solution, the pH-value is reduced to 5.5. By means of 3 molar ammonia solution, the pH-value is increased to 9.0. After stirring for 5 minutes, the phosphor suspension is destabilized by simultaneously adding 9.0 ml of a 2 molar ammonium-acetate solution and 5 ml of a 3 molar ammonia solution, with the pH-value being maintained at 9.0.

After stirring the phosphor suspension for another 30 minutes, the suspension of the coated ZnS:Cu,Au,Al-phosphor is allowed to sediment, whereafter it is decanted and washed 4 times with, each time, 2 l water. During the last washing process, a specific ion conductivity of 9.3 mS.cm$^{-1}$ and a pH-value of 9.2 in the phosphor suspension are measured. Finally, the coated phosphor is filtered off and dried in air at 140° C. for approximately 15 hours.

EXAMPLE 2

A quantity of 1 kg of green-luminescent ZnS:Cu,Au,Al-phosphor powder are dispersed, as described in example 1, with LUDOX® AS-solution (DuPont de Nemours). A quantity of 170 g of a 3.0 wt. % $SiO_2$-containing LEVASIL® VPAC40560-solution (Bayer) are added to the properly dispersed suspension of the ZnS:Cu,Au,Al-phosphor having a pH-value of 8.1. Further, 5.9 ml of a 2 molar ammonium-acetate solution are added to the phosphor suspension, thereby causing the pH-value to decrease to 7.3. Subsequently, 12 g of a $Zn(CH_3COO)_2$-solution containing 8.0 wt. % ZnO are added. As a result, the pH-value decreases to 5.9. By adding 1 molar $CH_3COOH$-solution, the pH-value is reduced to 5.5. By means of 4 ml of a 3 molar ammonia solution the pH-value is increased to 9.0. After stirring for 7 minutes, the phosphor suspension is destabilized by simultaneously adding 10 ml of a 2 molar ammonium-acetate solution and approximately 1 ml of a 3 molar ammonia solution, the pH-value being maintained at 9.0. After stirring the phosphor suspension for another 30 minutes, the suspension of the coated ZnS:Cu,Au,Al-phosphor is allowed to sediment, whereafter it is decanted and washed 2 times with, each time, 2 l water. During the last washing operation, a specific ion conductivity of 25 and a pH-value of 9.1 mS.cm$^{-1}$ are measured in the phosphor suspension. Finally, the coated phosphor is filtered off and dried in air at 140° C. for approximately 15 hours.

EXAMPLE 3

A quantity of 1 kg of pre-pigmented blue-luminescent ZnS:Ag,Al phosphor powder is dispersed, as described in example 1, in a LUDOX® AS-solution (DuPont de Nemours). A quantity of 160 ml of 0.5 molar NYACOL® 9950-solution (Alzo Nobel) are added to the properly dispersed suspension of the ZnS:Ag,Al-phosphor having a pH-value of 9.2. In addition, 6.3 ml of a 2 molar ammonium-acetate solution are added to the phosphor suspension, thereby reducing the pH-value to 8.5. Subsequently, 12 ml of a 0.5 molar $Zn(NO_3)_2$-solution are added. As a result, the pH-value decreases to 7.1. By adding 4.3 ml of a 1 molar $CH_3COOH$-solution, the pH-value is adjusted to 5.9. The pH-value is increased to 9.0 by means of 25 wt. % ammonia-solution. By adding 12 ml of a 2 molar ammonium-acetate solution, the phosphor suspension is destabilized, and the pH-value is maintained constant at 9.0.

After stirring the suspension for another 30 minutes, the suspension of the coated ZnS:Ag,Al phosphor is allowed to sediment, whereafter it is decanted and washed twice with 3 l water. In the last washing process, a specific ion conductivity of 63 mS.cm$^{-1}$ and a pH-value of 8.8 are measured in the phosphor suspension. Finally, the coated phosphor is filtered off and dried for 17 hours at 140° C.

EXAMPLE 4

A quantity of 1 kg of green-luminescent ZnS:Cu,Au,Al phosphor powder is dispersed, as described in example 1, in LUDOX® SM (DuPont de Nemours). A quantity of 90 g of a 3.0 wt. % $SiO_2$-containing NYACOL® 9950-solution (Akzo Nobel) are added to the properly dispersed suspension of the ZnS:Cu,Au,Al phosphor having a pH-value of 8.0. In addition, 1.8 ml of a 2 molar ammonium-acetate solution are added to the phosphor suspension. Subsequently, 7.1 ml of a 0.50 molar $Al(NO_3)_3$-solution are added. This causes the pH-value to be reduced to <5.5. The pH-value is increased to 9.0 by means of a 3 molar ammonia solution. After stirring for 10 minutes, 1.8 ml of 2 molar ammonium-acetate solution is added together with such a quantity of 3 molar ammonia solution that the pH-value is maintained at a constant value of 9.0.

After stirring the phosphor suspension for another 20 minutes, the suspension of the coated ZnS:Cu,Au,Al phosphor is allowed to sediment, whereafter it is decanted and washed twice with, each time, 2 l water. Finally, the coated phosphor is filtered off and dried in air at 140° C. for approximately 15 hours.

EXAMPLE 5

A quantity of 1 kg of blue-luminescent ZnS:Ag,Al phosphor powder is dispersed, as described in example 1, in a LUDOX® AS-solution (DuPont de Nemours). A quantity of 90 g of a 3.0 wt. % $SiO_2$-containing LEVASIL® VPAC4056-solution (Bayer) are added to the properly dispersed suspension of the ZnS:Ag,Al phosphor having a ph-value of 8.0. In addition, 2.7 ml of a 2 molar ammonium-acetate solution are added to the phosphor suspension. Subsequently, a quantity of 5.3 ml of a 0.50 molar $Ba(CH_3COO)_2$-solution are added. The pH-value is reduced to 5.5 by adding 1 molar $CH_3COOH$-solution. The pH-value is increased to 9.0 by means of 3 molar ammonia-solution. After stirring for 10 minutes, a quantity of 2.7 ml of 2 molar ammonium-acetate solution is added together with such a quantity of 3 molar ammonia solution that the pH-value is maintained at a constant value of 9.0.

After stirring the phosphor suspension for another 20 minutes, the suspension of the coated ZnS:Ag,Al phosphor is allowed to sediment, whereafter it is decanted and washed twice with, each time, 2 l water. Finally, the coated phosphor is filtered off and dried in air at 140° C. for approximately 15 hours.

EXAMPLE 6

A quantity of 1 kg of green-luminescent ZnS:Cu,Au,Al phosphor powder is dispersed, as described in example 1, in LUDOX® AS-solution (DuPont de Nemours). A quantity of 170 g of a 3.0 wt. % $SiO_2$-containing NYACOL® 9950-solution (Akzo Nobel) are added to the properly dispersed suspension of the ZnS:Cu,Au,Al phosphor having a pH-value of 8.0. In addition, 9.0 ml of a 2 molar ammonium-nitrate solution are added to the phosphor suspension, thereby reducing the pH-value to 7.2. Subsequently, 18 g of a $Zn(NO_3)_2$-solution containing 8.0 wt. % ZnO are added. This causes the pH-value to be reduced to 5.2. The pH-value is increased to 9.0 by means of a 3 molar ammonia solution After stirring for 5 minutes, the phosphor suspension is destabilized by concurrently adding 9.0 ml of a 2 molar ammonium-nitrate solution and 2.5 ml of a 3 molar ammonia solution, the pH-value being maintained at a constant value of 9.0.

After stirring the phosphor suspension for another 30 minutes, the suspension of the coated ZnS:Cu,Au,Al-phosphor is allowed to sediment, whereafter it is decanted and washed 4 times with, each time, 2 l water. In the last washing operation, a specific ion conductivity of 7.4 mS.cm$^{-1}$ and a pH-value of 9.2 were measured in the phosphor suspension. Finally, the coated phosphor is filtered off and dried in air at 140° C. for approximately 15 hours.

EXAMPLE 7

A quantity of 1 kg of green-luminescent ZnS:Cu,Au,Al phosphor powder is dispersed, as described in example 1, in LUDOX® AS-solution (DuPont de Nemours). A quantity of 170 g of a 3.0 wt. % $SiO_2$-containing NYACOL® 9950-solution (Akzo Nobel) are added to the properly dispersed suspension of ZnS:Cu,Au,Al phosphor having a pH-value of 8.0. In addition, 9.0 ml of a 2 molar ammonium-nitrate solution are added to the phosphor suspension, thereby causing the pH-value to be reduced to 7.3. Subsequently, 18 g of a $ZnSO_4$-solution containing 8.0 wt. % ZnO are added. This causes the pH-value to be reduced to 5.3. The pH-value is increased to 9.0 by means of a 3 molar ammonia solution. After stirring for 5 minutes, the phosphor suspension is destabilized by concurrently adding 9.0 ml of a 1 molar ammonium-sulphate solution and 2.5 ml of a 3 molar ammonia solution, the pH-value being maintained constant at 9.0.

After stirring the phosphor suspension for another 30 minutes, the suspension of the coated ZnS:Cu,Au,Al phosphor is allowed to sediment, whereafter it is decanted and washed 4 times with, each time, 2 l water. In the last washing operation, a specific ion conductivity of 22 $mS.cm^{-1}$ and a pH-value of 8.9 in the phosphor suspension were measured. Finally, the coated phosphor is filtered off and dried in air at 140° C. for approximately 15 hours.

EXAMPLE 8

A quantity of 1 kg of green-luminescent ZnS:Cu,Au,Al phosphor is dispersed, as described in example 1, in LUDOX® AS-solution (DuPont de Nemours). A quantity of 170 g of a 3.0 wt. % $SiO_2$-containing LEVASIL® VPAC4056-solution (Bayer) are added to the properly dispersed suspension of the ZnS:Cu,Au,Al phosphor having a pH-value of 8.4. Subsequently, 18 g of a $Zn(NO_3)_2$-solution containing 8.0 wt. % of ZnO are added. This causes the pH-value to be reduced to 5.3. The pH-value is increased to 9.0 by means of a 3 molar ammonia solution.

After stirring the phosphor suspension for another 30 minutes, the suspension of the coated ZnS:Cu,Au,Al phosphor is allowed to sediment, whereafter it is decanted and washed 3 times with, each time, 2 l water. In the last washing operation, a specific ion conductivity of 18 $mS.cm^{-1}$ and a pH-value of 9.0 in the phosphor suspension were measured. Finally, the coated phosphor is filtered off and dried in air at 140° C. for approximately 15 hours.

Testing Results

Table 1 shows the positive effect of the coating compositions in accordance with the invention as well as the effect of process conditions in accordance with the invention, i.e. the presence of complexing anions and the use of ammonium-salt on the destabilization of the product suspension at the end of the coating process. All inventive coatings 5 to 11 listed in Table 1 show a complete destabilization of the product suspension, even if the molar ratio between the overall quantity of colloidal $SiO_2$ and ZnO in the coating is very high, for example, 10 or 15. By contrast, to destabilize the product suspension of the reference coatings 1 to 4, which are not in accordance with the invention, it is necessary to increase the content of the ZnO-component in the coating, so that, depending on the quantity of $SiO_2$-containing dispersing agent used, a complete destabilization of the product suspension does not take place until a molar ratio, respectively, of 2.2 (cf. Table 1, reference coatings 1 and 2) and 1.1 (cf. Table 1, reference coatings 3 and 4) has been achieved. These very low molar ratios of the overall quantity of colloidal $SiO_2$ to ZnO generally lead, as mentioned hereinabove, to a lower suspension stability and sub-optimal screen properties in the display-screen manufacturing process, for example, to an increase in haziness as compared to the coatings in accordance with the invention.

Table 2 compares the results of measurements carried out on suspensions and display screens comprising phosphors coated in accordance with the invention to reference coatings which are not in accordance with the invention.

TABLE 1

| sample type of phosphor | ammonium salt in the coating process | fine-grain $SiO_2$ colloid in the preparation wt. % $SiO_2$ | coarse-grain $SiO_2$ kolloid in the preparation wt. % $SiO_2$ | ZnO in the preparation wt. % (counter-anion) | n($SiO_2$) overall/ n(ZnO) in the preparation | stability of the product suspension |
|---|---|---|---|---|---|---|
| Reference coatings |||||||
| 1 ZnS:Cu, Au,Al | — | 0.012 $K_2SiO_3$ | 0.25 SYTON W | 0.083 (nitrate) | 4.3 | partly stable |
| 2 ZnS:Cu, Au,Al | — | 0.012 $K_2SiO_3$ | 0.25 SYTON W | 0.16 (nitrate) | 2.2 | completely destabilized |
| 3 ZnS:Cu, Au,AL | — | 0.039 $K_2SiO_3$ | 0.26 SYTON W | 0.27 (nitrate) | 1.4 | partly stable |
| 4 ZnS:Cu, Au,Al | — | 0.039 $K_2SiO_3$ | 0.25 SYTON W | 0.27 (nitrate) | 1.1 | completely destabilized |
| coatings in accordance with the invention |||||||
| 5 ZnS:Cu, Au,Al | $NH_4CH_3COO$ in process step c) and g) | 0.040 LUDOX AS | 0.50 LEVASIL VPAC4056 | 0.073 (acetate) | 10 | completely destabilized |
| 6 ZnS:Cu, Au,Al | $NH_4CH_3COO$ in process step c) and g) | 0.040 LUDOX AS | 0.50 NYACOL 9950 | 0.049 (acetate) | 15 | completely destabilized |
| 7 ZnS:Cu, Au,Al | $NH_4CH_3COO$ in process step c) and g) | 0.040 LUDOX AS | 0.50 NYACOL 9950 | 0.073 (nitrate) | 10 | completely destabilized |
| 8 ZnS:Cu, Au,Al | $NH_4CH_3COO$ in process step c) and g) | 0.040 LUDOX AS | 0.50 NYACOL 9950 | 0.073 (sulfate) | 10 | completely destabilized |
| 9 | $NH_4CH_3COO$ | 0.040 | 0.50 | 0.073 | 10 | completely |

TABLE 1-continued

| sample type of phosphor | ammonium salt in the coating process | fine-grain SiO$_2$ colloid in the preparation wt. % SiO$_2$ | coarse-grain SiO$_2$ kolloid in the preparation wt. % SiO$_2$ | ZnO in the preparation wt. % (counter-anion) | n(SiO$_2$) overall/ n(ZnO) in the preparation | stability of the product suspension |
|---|---|---|---|---|---|---|
| ZnS:Cu, Au,Al 10 | in process step c) and g) NH$_4$CH$_3$COO | LUDOX AS 0.040 | LEVASIL VPAC4O56 0.50 | 0.073 (acetate) | 10 | destabilized completely destabilized |
| ZnS:Cu, Au,Al 11 | in process step c) and g) — | LUDOX AS 0.040 | LEVASIL VPAC4O56 0.50 | 0.073 (acetate) | 10 | completely destabilized |
| ZnS:Cu, Au,Al | | LUDOX AS | LEVASIL VPAC4O56 | (acetate) | | |

TABLE 2

| sample type of phosphor | coating | filterability mL/10 s | destabilisation test $\Delta d_{50}/\mu m$ | Sediment | haziness | dot filling ratio |
|---|---|---|---|---|---|---|
| coatings in accordance with the invention ||||||| 
| 1 ZnS:Cu, Au,Al | 0.050 wt. % $SiO_2$ from LUDOX SM, 0.27 wt. % $SiO_2$ from NYACOL9950, 0.050 wt. % ZnO + $NH_4CH_3COO$, $n(SiO_{2\ 1\ overall})/n(ZnO) = 8.7$ | fresh: 680 after 6 days: 680 | 0.093 | semi-compact | 0.5 | good |
| 2 ZnS:Cu, Au,Al | 0.050 wt. % $SiO_2$ from LUDOX AS, 0.47 wt. % $SiO_2$ from NYACOL9950, 0.050 wt. % ZnO + $NH_4CH_3COO$, $n(SiO_2\ overall)/n(ZnO) = 14.1$ | fresh: 570 after 3 days: 560 | 0.11 | semi-compact | 0.5 | good |
| 3 ZnS:Ag | 0.050 wt. % $SiO_2$ from LUDOX AS, 0.27 wt. % $SiO_2$ from NYACOL9950, 0.050 wt. % ZnO + $NH_4CH_3COO$, $n(SiO_2\ overall)/n(ZnO) = 8.7$ | fresh: 410 after 3 days: 470 | 0.000 | solid | 0.5 | good |
| 4 ZnS:Ag | 0.050 wt. % $SiO_2$ from LUDOX AS, 0.47 wt. % $SiO_2$ from NYACOL995O, 0.050 wt. % ZnO + $NH_4CH_3COO$, $n(SiO_2\ overall)/n(ZnO) = 14.1$ | fresh 650 after 3 days: 720 | 0.07 | semi-compact | 0.5 | good |
| reference coatings ||||||| 
| 5 ZnS:Cu, Au,Al | 0.050 wt. % $SiO_2$ from LUDOX SM, 0.27 wt. % $SiO_2$ from NYACOL9950, 0.20 wt. % ZnO + $NH_4CH_3COO$, $n(SiO_2\ overall)/n(ZnO) = 2.2$ | fresh 680 after 6 days 660 | 0.528 | semi-compact | 2 | mediocre |
| 6 ZDS:Cu, Au,Al | 0.060 wt. % $SiO_2$ from LUDOX AS, 0.35 wt. % $SiO_2$ from LEVASIL VPAC 4056, 0.12 wt. % ZnO + $NH_4CH_3COO$, $n(SiO_2\ overall)/n(ZnO) = 4.5$ | fresh: 630 after 3 days: 120 | 0.19 | semi-compact | 1 | poor |
| 7 ZnS:Cu, Au,Al | 0.020 wt. % $SiO_2$ from $K_2SiO_3$, 0.25 wt. % ZnO $n(SiO_2\ overall)/n(ZnO) = 0.11$ | fresh: 680 after 6 days: 530 | 0.141 | compact | 3 | poor |

We claim:

1. A display screen having a phosphor coating comprising a phosphor provided with a coating which comprises colloidal $SiO_2$ particles and at least one oxygen compound of an element selected from the group consisting of zinc, aluminum, magnesium, calcium and barium, in a molar ratio of the $SiO_2$ particles to the at least one oxygen compound of from 5:1 to 30.1, characterized in that the colloidal $SiO_2$ particles are composed of $SiO_2$ particles having an average particle size of 4 nm $\leq$ d $\leq$ 30 nm corresponding to a specific surface of 100 m$^2$/g $\leq A_s \leq$ 550 m$^2$/g, and $SiO_2$ particles having an average particle size of 50 nm $\leq$ d $\leq$ 150 nm, corresponding to a specific surface of 25 m$^2$/g $\leq A_s \leq$ 70 m$^2$/g.

2. A display screen having a phosphor coating as claimed in claim 1, characterized in that the coating comprises 0.01 wt. % to 0.07 wt. %, calculated with respect to the phosphor, of colloidal $SiO_2$ particles having an average particle size of 4 nm$\leq$d $\leq$30 nm, and 0.10 wt. % to 1.5 wt. %, calculated with respect to the phosphor, of colloidal $SiO_2$ particles having an average particle size of 50 nm$\leq$d$\leq$150 nm.

3. A display screen having a phosphor coating as claimed in claim 1, characterized in that the oxygen compound is a zinc-oxygen compound.

4. A display screen having a phosphor coating as claimed in claim 1, characterized in that the colloidal $SiO_2$ particles having an average size of 50 nm$\leq$d $\leq$150 nm, corresponding to a specific surface of 25 $m^2/g \leq A_s \leq 70$ $m^2/g$, have a polydisperse particle-size distribution.

5. A display screen having a phosphor coating as claimed in claim 1, characterized in that the coating contains a color-filter pigment.

6. A display screen having a phosphor coating as claimed in claim 1, characterized in that the phosphor composition contains a color-filter pigment in a separate coating.

7. A phosphor provided with a coating which comprises colloidal $SiO_2$ particles and at least one oxygen compound of an element selected from the group consisting of zinc, aluminum, magnesium, calcium and barium, in a molar ratio of the $SiO_2$ particles to the at least one oxygen compound of from 5:1 to 30.1, characterized in that the colloidal $SiO_2$ particles are composed of $SiO_2$ particles having an average particle size of 4 nm$\leq$d$\leq$30 nm corresponding to a specific surface of 100 $m^2/g \leq A_s \leq 550$ $m^2/g$, and $SiO_2$ particles having an average particle size of 50 nm$\leq$d$\leq$150 nm, corresponding to a specific surface of 25 $m^2/g \leq A_s \leq 70$ $m^2/g$.

8. A method of providing a phosphor with a coating comprising colloidal $SiO_2$ particles and at least one oxygen compound of an element selected from the group consisting of zinc, aluminum, magnesium, calcium and barium, said method comprising:

a) forming a suspension of a phosphor;

b) adding diluted ammonia to said suspension in an amount sufficient to obtain a pH-value of $\geq 9.2$ for said suspension c) grinding said suspension with, in succession, colloidal $SiO_2$ particles having a average particle size of 4 nm$\leq$d$\leq$30 nm, a colloidal solution of colloidal $SiO_2$ particles having an average particle size of 50 nm$\leq$d$\leq$150 nm, an aqueous ammonium salt solution and an aqueous solution of a water-soluble salt of an element selected from the group consisting of zinc, aluminum, magnesium, calcium and barium, d) adding diluted acid to said suspension in an amount sufficient to reduce the pH value of said suspension to pH$\leq$7, e) increasing the pH value of said suspension to pH$\geq$8, and f) separating out the resultant coated phosphor.

* * * * *